(12) United States Patent
Wong et al.

(10) Patent No.: US 8,365,203 B2
(45) Date of Patent: Jan. 29, 2013

(54) METHOD FOR CREATING A NATIVE APPLICATION FOR MOBILE COMMUNICATIONS DEVICE IN REAL-TIME

(75) Inventors: Chi Hang Wong, Hong Kong (HK); Kin Lun Law, Hong Kong (HK)

(73) Assignee: Willflow Limited, Shatin (HK)

( * ) Notice: Subject to any disclaimer, the term of this patent is extended or adjusted under 35 U.S.C. 154(b) by 960 days.

(21) Appl. No.: 12/408,319

(22) Filed: Mar. 20, 2009

(65) Prior Publication Data
US 2009/0241135 A1 Sep. 24, 2009

Related U.S. Application Data

(60) Provisional application No. 61/038,241, filed on Mar. 20, 2008.

(51) Int. Cl.
*G06F 3/00* (2006.01)
*G06F 17/00* (2006.01)
(52) U.S. Cl. ......... 719/328; 715/765; 715/234; 715/239
(58) Field of Classification Search .................. None
See application file for complete search history.

(56) References Cited

U.S. PATENT DOCUMENTS

| | | | | |
|---|---|---|---|---|
| 6,195,694 | B1 * | 2/2001 | Chen et al. ..................... | 709/220 |
| 7,085,814 | B1 * | 8/2006 | Gandhi et al. ................. | 719/328 |
| 7,487,085 | B2 * | 2/2009 | Ativanichayaphong et al. ............................ | 715/239 |
| 7,644,414 | B2 * | 1/2010 | Smith et al. .................... | 719/328 |
| 2003/0193521 | A1 * | 10/2003 | Chen et al. ..................... | 345/762 |
| 2007/0005624 | A1 * | 1/2007 | Wu et al. ........................ | 707/101 |
| 2008/0016187 | A1 * | 1/2008 | Neil et al. ...................... | 709/220 |
| 2008/0282142 | A1 * | 11/2008 | Butlin et al. ................... | 715/234 |
| 2009/0013031 | A1 * | 1/2009 | Nolet et al. .................... | 709/203 |
| 2009/0019386 | A1 * | 1/2009 | Sweetland et al. ............ | 715/765 |
| 2009/0150518 | A1 * | 6/2009 | Lewin et al. ................... | 719/328 |

OTHER PUBLICATIONS

HowStuffWorks.com's Big List of HTML Tags, "How Web Pages Work" (www.howstuffworks.com/web-page.htm), 2000, HowStuffWorks.com, Inc, p. 1.*
Further Web design: HTML forms Practical workbook, University of Bristol, 2006, pp. 1-15.*
Phanouriou et al., UILM: A Device-Independent User Interface Markup Language, 2000, pp. 1-172.*
Voelker et al., Mobisaic: An Information System for a Mobile Wireless Computing Environment, pp. 1-6.*

* cited by examiner

*Primary Examiner* — Andy Ho
*Assistant Examiner* — Tuan Dao
(74) *Attorney, Agent, or Firm* — Kauth, Pomeroy, Peck & Bailey LLP

(57) ABSTRACT

A software client (139) for executing an application on a mobile communications device, the software client (139) comprising: a receiver module (140) to receive a file containing mark up language to define the application; a parser (141) to parse the file in order to generate the application during run time to create a native application for the mobile communications device; a screen builder (142) to generate UI components for the native application by mapping procedures defined by the mark-up Language to native application programming interface (API) calls of the operating platform of the mobile communications device.

15 Claims, 11 Drawing Sheets

```
<html>
<head>
<title>Page A</title>
</head>
<body>
<table>
<tr><td>
<a href="a1.html">
<img src="a1.png"/>hello 1</a></td></tr>
<tr><td>
<a href="a2.html">
<img src="a2.png"/>hello 2</a></td></tr>
</table>
</body>
</html>
```

METHOD FOR CREATING A NATIVE APPLICATION FOR MOBILE COMMUNICATIONS DEVICE IN REAL-TIME

CROSS-REFERENCE TO RELATED APPLICATIONS

The present application claims priority to U.S. Provisional Patent No. 61/038,241 filed Mar. 20, 2008, the disclosure of which is incorporated herein by reference.

TECHNICAL FIELD

The invention concerns a method and system for creating a native application for a mobile communications device in real-time.

BACKGROUND OF THE INVENTION

It is difficult for most people to create cross-platform mobile applications. Mobile communications devices operate on different platforms such as the Apple iPhone OS, Window Mobile, Symbian, Palm, S60 and Google Android. Each platform has its own programming language and requirements.

Traditionally, creating a native application on a specific platform requires learning and writing a computer language specific to that platform. Consequently, cross platform applications requires re-writing the application for each platform and programmers with expertise in multiple programming languages. This is time-consuming and expensive. Also, as new platforms emerge, authors of applications must familiarize themselves with the programming language of the new platform in addition to their knowledge of existing platforms.

Technologies such as Java™ create a platform independent virtual machine to assist with the deployment of applications to multiple platforms. However, the user interface (UI) generated by Java applications are distinctively different from the native UI of the original platform. Firstly, the Java UI is not aesthetically pleasing. Secondly, the Java UI is slower than the native UI because the Java virtual machine acts as an additional layer between the Java program and the underlying native API/operating system.

SUMMARY OF THE INVENTION

In a first preferred aspect, there is provided a method for executing an application on a mobile communications device. The method includes parsing a file containing mark up language to define the application. The method also includes generating the application during run time to create a native application for the mobile communications device. The method also includes generating user interface (UI) components for the native application by mapping procedures defined by the mark-up language to native application programming interface (API) calls of the operating platform of the mobile communications device.

The mark up language may be hypertext markup language (HTML) with extensions to the <a> tag, <div> tag, <input> tag, <select> tag, <table> tag and <td> tag.

The file may be parsed by a software client and the application is generated by the software client.

The software client may maintain an operation queue, node structure, database and view stack.

The method may further include loading a start page by inserting a root universal resource locator (URL) link into the operation queue. The method may also include storing a subset of elements in the node structure. The method may also include traversing the elements in the node structure, building a UI screen from the node structure using native UI components.

Data transfer between the software client and an external server may be mediated by an internal web server.

The internal web server may transfer the data communication between the software client and the external server without making any changes.

The internal server may be a fully functional backend that handles all the client requests such that the software client is able to function without being connected to the external server by allowing the internal web server to return cached files instead of fetching them from the external server.

An image node element may insert a load image operation into the operation queue such that the image is post-loaded as the image is loaded only after other UIs have been constructed An outward link node element may insert a load page operation into the operation queue such that the page is preloaded as the page is loaded before the user sees it.

The method may further include handling navigation from a current screen to a next screen by inserting the link of the next screen into the operation queue and assigning it with the highest priority. The method may also include handling map and GPS interaction by inserting native controls above a map web view. The method may also include handling camera and file dialog by triggering a local camera and file dialog. If a user clicks on a link that leads away from the current page, the operation queue is emptied and the current screen is loaded to the view stack.

In a second aspect, there is provided a system for executing an application on a mobile communications device. The system includes a data source to supply a file containing mark up language to define the application. The system also includes a software client provided on a mobile communications device to receive and parse the file in order to generate the application during run time to create a native application for the mobile communications device and to generate user interface (UI) components for the native application by mapping procedures defined by the mark-up language to native application programming interface (API) calls of the operating platform of the mobile communications device.

The system may further comprise a map to define relationships between the procedures and native API calls for a plurality of operating platforms for mobile communications devices, the map being read by the software client when generating the application.

The system may further comprise a visual graphical user interface authoring tool to generate the file by visual manipulation of graphical components on a grid, and to provide templates for common operations.

The data source may be an external server accessible via the Internet or an internal web server.

In a third aspect, there is provided a software client for executing an application on a mobile communications device. The software client includes a receiver module to receive a file containing mark up language to define the application. The software client also includes a parser to parse the file in order to generate the application during run time to create a native application for the mobile communications device. The software client also includes a screen builder to generate UI components for the native application by mapping procedures defined by the mark-up language to native application programming interface (API) calls of the operating platform of the mobile communications device.

BRIEF DESCRIPTION OF THE DRAWINGS

An example of the invention will now be described with reference to the accompanying drawings, in which.

DETAILED DESCRIPTION OF THE DRAWINGS

Figure 1:
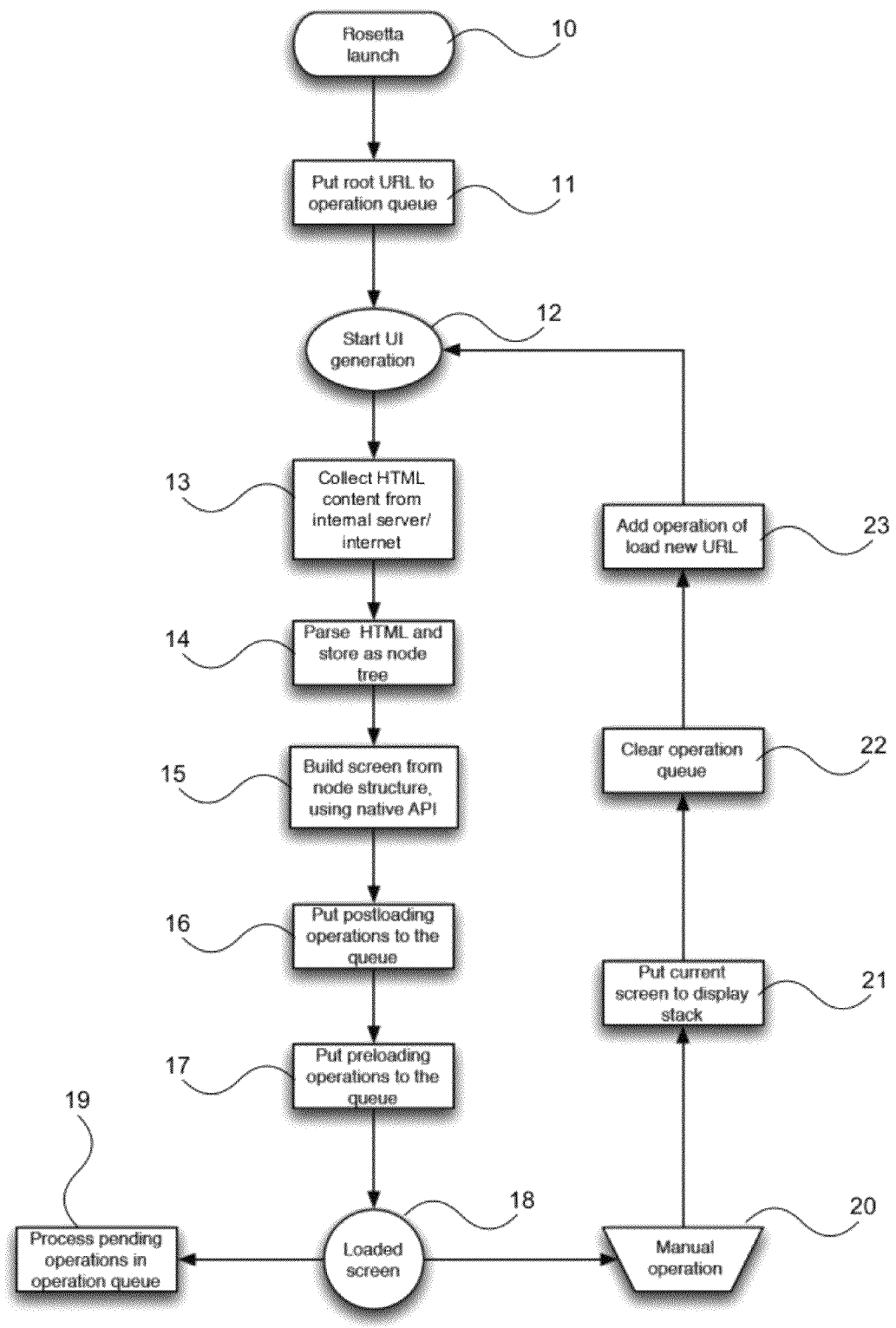
FIG. 1 is a process flow diagram of executing an application on a mobile communications device.

Referring to the drawings, a system for executing an application on a mobile communications device is provided. The system has a data source 150, 151 to supply a file containing mark up language to define the application. The system also has a software client 139 provided on a mobile communications device to receive and parse the file in order to generate the application during run time to create a native application for the mobile communications device. Preferably, the mobile communications device is a mobile phone (using at least 2G for voice communication) and with Internet access. The software client also generates user interface (UI) components for the native application by mapping procedures defined by the mark-up language to native application programming interface (API) calls of the operating platform of the mobile communications device.

The system is an enabler which means that developers and authors can construct applications for mobile communications devices without requiring specific knowledge about each platform for every mobile communications device. Consequently, authors can focus their effort on the application itself such as its functionality, presentation and interaction with mobile phone users. It is hoped that better applications are developed because no time needs to be spent on learning and programming for every mobile platform. An author with some basic hypertext markup language (HTML) programming knowledge simply needs to build a website using HTML tags with some intuitive extensions. This leverages the author's familiarity with HTML tags to enable fast development of an application. Afterwards, the author provides the URL of their website to a service provider. The service provider creates the application for the mobile platforms requested by the author.

The application for the mobile communications device is generated in real time rather than traditionally in compile time. Real time means if the server changes the HTML, for example, adding a search bar, the change is reflected immediately in the application. This concept similar to a web browser but differs in that it is for an application which uses native user interface (UI) components instead of rendering standard HTML components in a web browser.

The software client called a Rosetta client 139 is created for each mobile platform. A cross platform UI specification called the Rosetta HTML specification is provided that is used by all Rosetta clients 139 and a Rosetta HTML file is received by a receiver 140 and parsed by a parser 141. The Rosetta client 139 generates the application using a screen builder 142. Based on the UI specification, the Rosetta client 139 generates the UI using the dynamic properties of the platform-specific UI libraries and the native application programming interface (API) of the mobile platform. The UI components that can be built that are as simple as a button or as complex as a map, camera or image editor.

Turning to FIG. 1, the Rosetta client 139 maintains the following data structures: operation queue 24, node structure 144, database 145 and view stack 146. All operations are performed by inserting themselves into the operation queue 24. The items in the operation queue 24 can be prioritized, change priority or removed at any time. After parsing a Rosetta HTML file, the result is stored in the node structure 144 which preferably is a tree. Each node of the node structure 144 is mapped to a corresponding function of a platform-specific software development kit (SDK). Mapping may be performed by reading a map 152 between the procedures of the Rosetta HTML specification and the native API of a specific mobile platform. The database is used for caching and accessing structural information. The current screen is always placed on the top of the view stack 146. The previous screen is hidden but not removed. Returning to the previous screen is done by popping the view stack 146. Progressing to the next screen is done by placing the screen on the top of the stack 146.

Figures 2, 3:
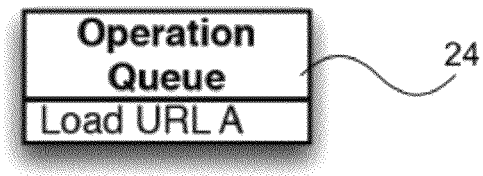
FIG. 2 is an operation that is loaded in an operation queue.
FIG. 3 is an example Rosetta HTML file.
Figure 4:
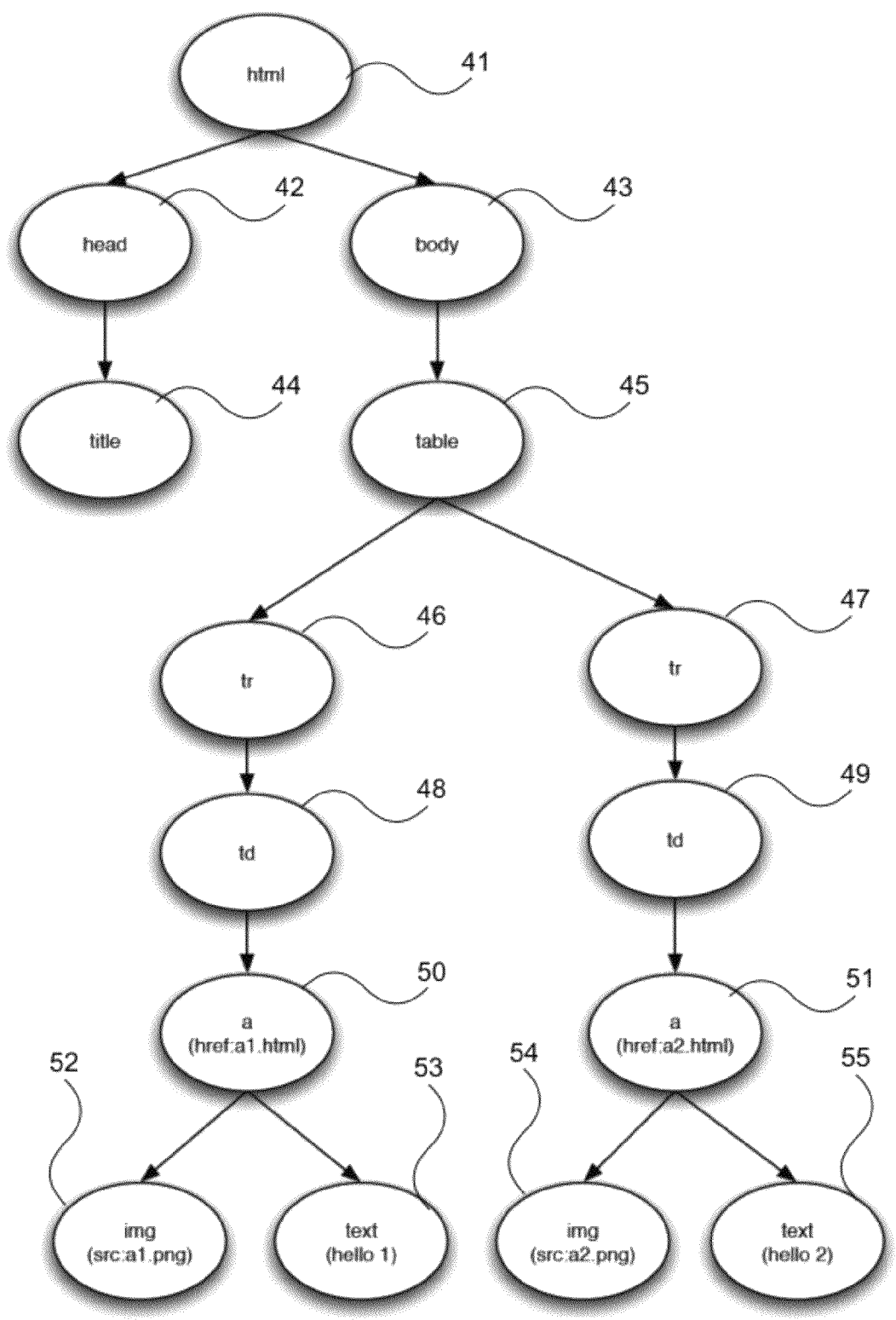
FIG. 4 is a node structure of the HTML file of FIG. 3.
Figure 5:
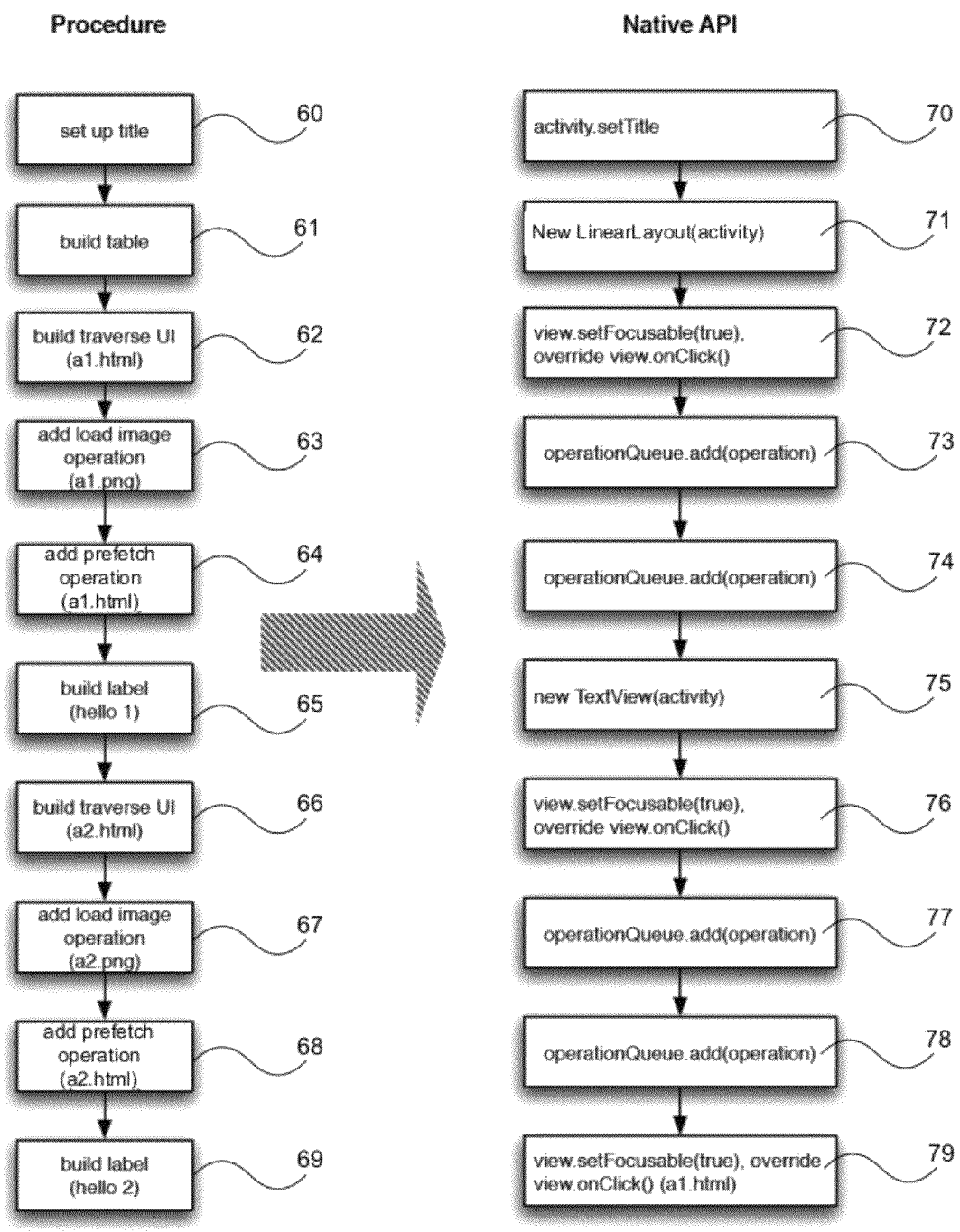
FIG. 5 is a diagram illustrating the mapping of procedures defined in the HTML file to native API calls of the Android mobile platform.
Figure 6:
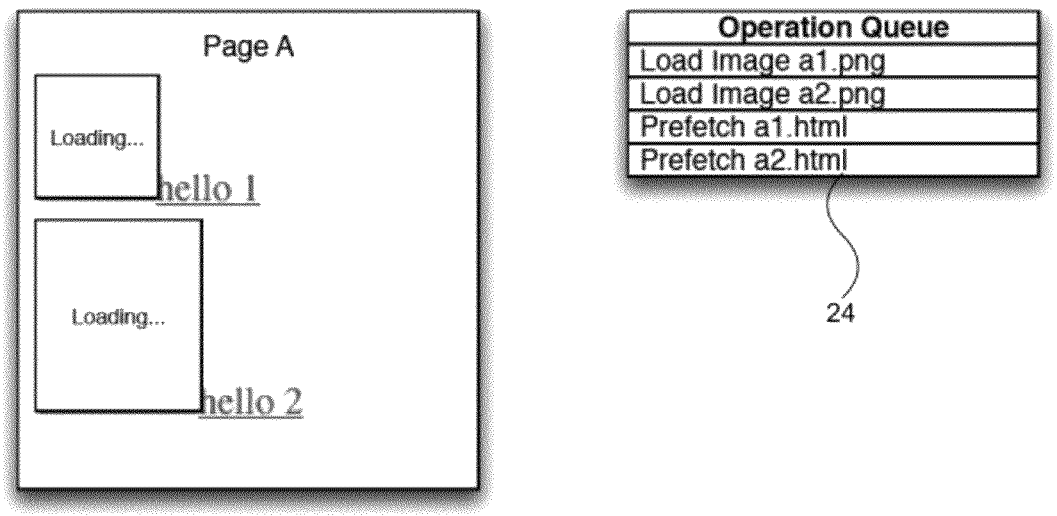
FIG. 6 is a diagram of a screen of the mobile communications device and the operation queue when the screen is being loaded.
Figure 7:
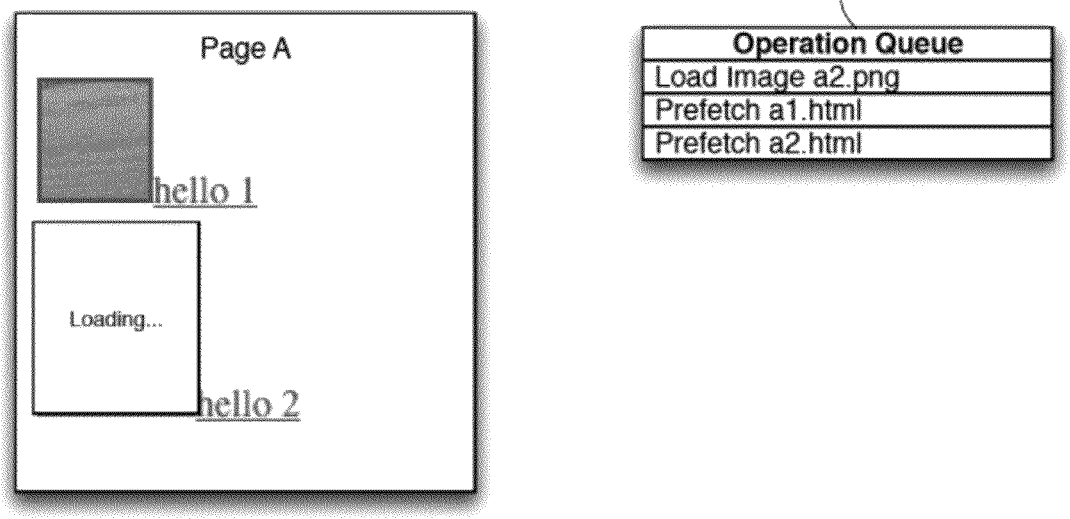
FIG. 7 is a diagram of a screen of the mobile communications device and the operation queue after post-loading of an image file "a1.png"
Figure 8:
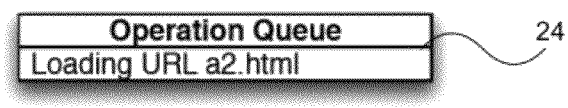
FIG. 8 is a loading operation that is inserted into the operation queue which occurs after a "hello 2" link is clicked.

To execute the application on the mobile communications device, the Rosetta client 139 is started (10). Every application has a root URL. The root URL is inserted (11) into the operation queue using a "Load Root URL" operation. FIG. 2 depicts the operation of "Load URL A" into the operation queue 24. The operation queue 24 maintains the sequence of operation for the Rosetta client 139. Next, the UI generation process is started (12). The Rosetta client 139 downloads/retrieves 13 the content from the root URL which is a Rosetta HTML file from an internal server 151 or via the Internet. An example Rosetta HTML file is depicted in FIG. 3. Next, the Rosetta client 139 parses (14) the HTML document to generate a HTML node tree as depicted in FIG. 4. FIG. 4 shows an example of the node structure for the example Rosetta HTML file of FIG. 3. After obtaining the HTML node tree, the Rosetta client 139 starts to build (15) the screen/user interface using the native API provided by the platform specific SDK. An example of the building process is illustrated in FIG. 5 where the procedures in the Rosetta HTML file are mapped to the native API of the Android platform. The operation queue 24 is read when the screen is loaded. After building the screen, post-loading operations are added (16) to the operation queue if they exist such as loading images. For example, an image node inserts the "Load Image" operation into the operation queue 24. This means the image is post-loaded because the image is only loaded after the UI has been constructed. This is depicted in FIG. 7. Another example is an outward link node which inserts the "Load page" operation into the operation queue. This means that the page is pre-loaded because the page is loaded before the user sees it. The flow is modified such that after a1.html is pre-fetched, the user clicks on "hello 1", and in this case, "a1.html" does not need to load as it can be directly loaded from the cache 153 in the database 145. FIG. 8 depicts what occurs when a user clicks on the link "hello 2". The operation queue 24 is cleared and "Load URL a2.htmL" is inserted in the operation queue 24. Also, preloading operations, such as loading HTML documents for a next screen, are added (17) to the operation queue 24. Next, the operations of the operation queue are executed (18) and the screen is created. Other pending operations in the operation queue 24 are executed (19) accordingly.

The operation queue can be preempted if the user interacts (20) with the application and triggers another page such as clicking on a button. The current screen is pushed (21) to the top of the view stack 146. The view stack 146 maintains the navigation sequence so that users can easily and quickly go back to the previous screen. The operation queue of the current screen is cleared (22) because of the loading of a new screen and the URL of the new screen is added (23) to the operation queue 24. The UI generation is started again (12).

The data transfer between the Rosetta client and the external server 150 is mediated by an internal web server 151. On the one hand, the internal web server 151 can be simple and it passes the communication between the client 139 and external server 150 without any changes. On the other hand, the internal web server 151 can be a fully functional backend that handles all the requests of the client 139. In such a case, the Rosetta client 139 can function without being connected to the external server 150 (and without Internet access availability). Caching is done by letting the internal web server 151 return the cached files instead of fetching them from the external server 150.

In FIG. 5, some API calls of the Android API are depicted which have the following function.

| API call | Function |
| --- | --- |
| setTitle | Change the title associated with this activity. If this is a top-level activity, the title for its window will change. If it is an embedded activity, the parent can do whatever it wants with it. |
| LinearLayout | A Layout that arranges its children in a single column or a single row. The direction of the row can be set by calling setOrientation[ ]. You can also specify gravity, which specifies the alignment of all the child elements by calling setGravity[ ] or specify that specific children grow to fill up any remaining space in the layout by setting the weight member of LinearLayout.LayoutParams. The default orientation is horizontal. |
| Orientation | Should the layout be a column or a row. either HORIZONTAL or VERTICAL |
| View.setFocusable | Set whether this view can receive the focus. Setting this to false will also ensure that this view is not focusable in touch mode. |
| OnClickListener.onClick | Called when a view has been clicked. |
| Queue.add | Attempts to add object to the contents of this Collection. |
| ImageView | Displays an arbitrary image, such as an icon. The ImageView class can load images from various sources [such as resources or content providers], takes care of computing its measurement from the image so that it can be used in any layout manager, and provides various display options such as scaling and tinting. |
| TextView | Displays text to the user and optionally allows them to edit it. A TextView is a complete text editor, however the basic class is configured to not allow editing. |

The native API examples depicted in FIG. 5 use the Android platform native API. The Rosetta client traverses the HTML node tree depicted in FIG. 4 to construct the user interface screen. Firstly, it obtains the title from the "title" node 44 in the HTML node tree and sets the title to native program 60. For example, the native API in Android platform for setting up the title is by calling the "Activity" typed instance with method "setTitle" (i) and pass the title to the activity.setTitle(title) method 70.

The "body" node 43 is used to build the body part of the screen. For building the "table" node 61, the Rosetta client builds the table UI component by using the native API such as "LinearLayout" class 71. "tr" node 46 and "td" nodes 48 are used to control the orientation of the "LinearLayout" 71. The "a" node 50 is processed which has a URL of a1.html 62. The Rosetta client marks the "row" as focusable using native API, View.setFocusable(true) 72, and handles the click event action using native API by overriding the onClick method in View.OnClickListener interface 72.

The "img" node 52 is processed which adds 63 the loading image operation to the operation queue by using internal queue API in the native platform, that is, queue.add 73. The postloading image is displayed by using ImageView. Next, the a1.html URL is added 64 to the operation queue for prefetching operation. For processing 65 a text node 53 with text "hello 1", the Rosetta client uses "TextView" native class to construct the text label with "hello 1" text 75. The subtree of the second "tr" node 47 is operated on similarly as the first "tr" node 46.

The system extends existing HTML language to facilitate easier and quicker understanding of how to develop applications using the system. The extended HTML attributes for presenting UI components on the mobile communications device are described in the tables below:

Extending the <a> tag

| Attribute | Description |
| --- | --- |
| wf_style="navigation_unchanged" | After following the link from page A to page B, use the navigation of A in page B. For example, if A has a "Back" button that goes back to the "Home" screen, the same "Back" button will appear on page B. |
| wf_style="navigation_reset" | After following the link from page A to page B, reset all navigation and load page B as if it is the beginning of the app. |
| wf_style="browser" | Open the link with a web browser. |
| wf_style="popup_bottom" | Open the link with a popup that is placed at the bottom. |
| wf_style="popup_center" | Open the link with a popup that is placed at the center. |
| wf_style="popup" | Same as "popup_bottom". |
| wf_style="toolbar" | Create a button at the toolbar. To put an image icon on the toolbar, use <img> to create an image link. |
| wf_style="toolbar_back" | Create a button at the "Back" button position. |
| wf_style="toolbar_up_arrow" | Create a up arrow button at the toolbar. |
| wf_style="toolbar_down_arrow" | Create a down arrow button at the toolbar. |
| wf_style="toolbar_left_arrow" | Create a left arrow button at the toolbar. |
| wf_style="toolbar_right_arrow" | Create a right arrow button at the toolbar. |
| wf_geo_location="LAT,LNG" | Use it inside a map to create a flag with latitude LAT and longitude LNG. |

Extending the <div> tag

| Attribute | Description |
| --- | --- |
| wf_style="text_alert" | Render the text in the section in alert style, usually in bold and red color. |
| wf_style="text_bold" | Render the text in the section as bold text. |
| wf_style="text_small" | Render the text in the section as small text. |
| wf_style="padding" | Insert padding in the <div>. |
| wf_style="iphone_picker_embedded" | Enclose a <select> in <div> to create an iPhone style picker that is embedded on the screen. |
| wf_style="header" | Create a header. |
| wf_style="footer" | Create a footer. |
| wf_type="map" | Create a map. See <div wf_type="map">. |
| wf_type="tabbar" | Create a tabbar. See <div wf_style="tabbar">. |

Extending the <input> tag

| Attribute | Description |
| --- | --- |
| type="file" | Create a file dialog. In iPhone, the default is camera. In iPod touch, the default is the photo album. |
| type="file" wf_type="camera" | Create a camera. |
| type="file" wf_type="user_album" | Create the user multimedia album. |
| type="file" wf_type="system_album" | Create the system multimedia album. |
| type="hidden" | Create a hidden field. |
| type="password" | Create a password field, where the input text is masked. |
| type="password" wf_style="auto_correction" | Create a password field, where the input text is masked and auto corrected. |
| type="text" | Create a text box, where the input text is auto corrected. |
| type="text" wf_style="auto_correction_off" | Create a text box, where the input text is not auto corrected. |
| type="text" wf_style="search" | Create a search box. In iPhone, it changes the "Return" button of the keyboard to a "Search" button. |
| type="submit" | Create a submit button. |
| type="submit" wf_style="toolbar" | Create a submit button at the toolbar. To put an image icon on the toolbar, use <img> to create an image link. |
| type="submit" wf_style="toolbar_back" | Create a button at the "Back" button position. |
| type="submit" wf_style="toolbar_up_arrow" | Create a up arrow button at the toolbar. |
| type="submit" wf_style="toolbar_down_arrow" | Create a down arrow button at the toolbar. |
| type="submit" wf_style="toolbar_left_arrow" | Create a left arrow button at the toolbar. |
| type="submit" wf_style="toolbar_right_arrow" | Create a right arrow button at the toolbar. |

Extending the <select> tag

| Attribute | Description |
| --- | --- |
| wf_style="segment" | The drop-down list is shown as a segment. |
| wf_style="popup" | Hide the drop-down list. Show it as popup after the "Submit" button is clicked. |

Extending the <table> tag

| Attribute | Description |
| --- | --- |
| wf_style="transparent" | Make the table transparent. |
| wf_style="fullscreen" | Stretch the column to fill up the whole screen. |
| bgcolor="#XXXXXX" | Set back ground color of table. |

Extending the <td> tag

| Attribute | Description |
| --- | --- |
| width="X%" | Specify the cell's width as X percentage of the table's width. |
| align="center" | Align the elements inside <td> tags at the center. |
| align="right" | Align the elements inside <td> tags to the right. |
| bgcolor="#XXXXXX" | Set back ground color of cell. |

Figure 13:
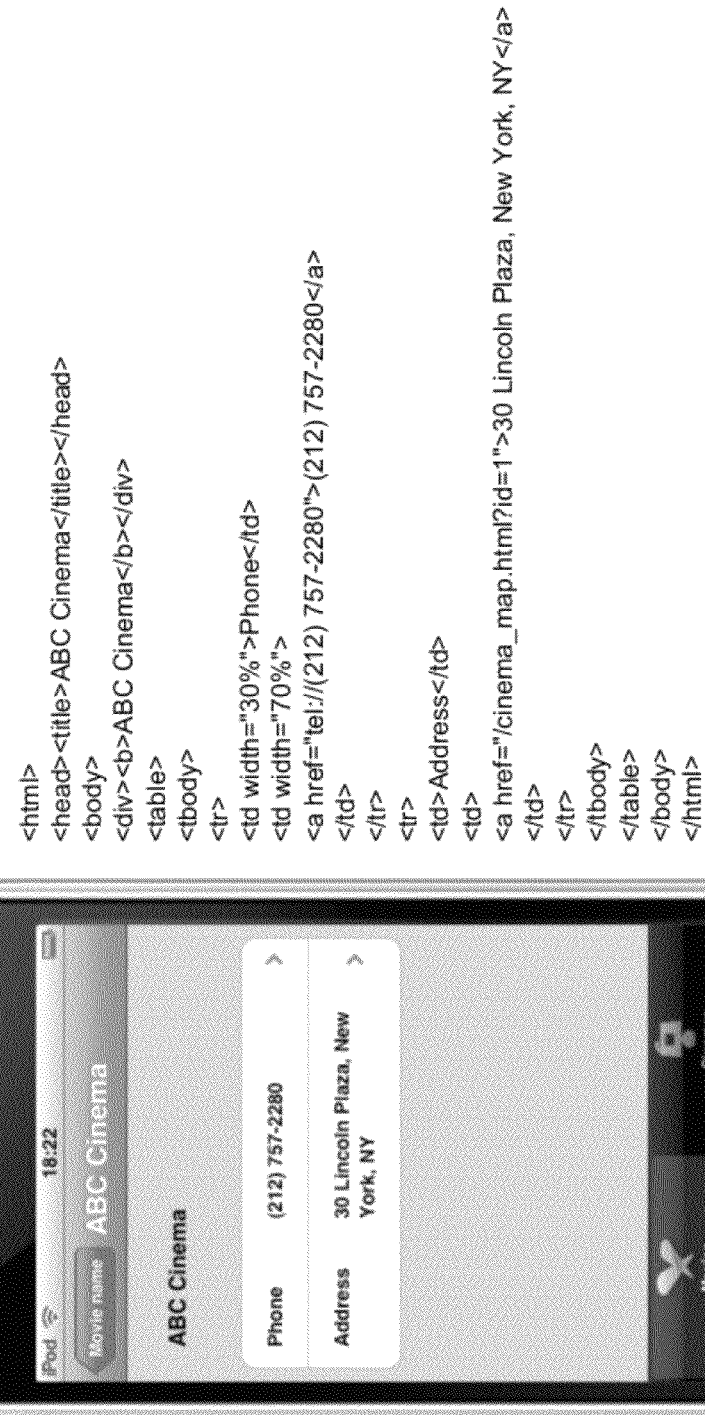
FIG. 13 is a screenshot of an application using a table together with it associated Rosetta HTML file.
Figure 14:
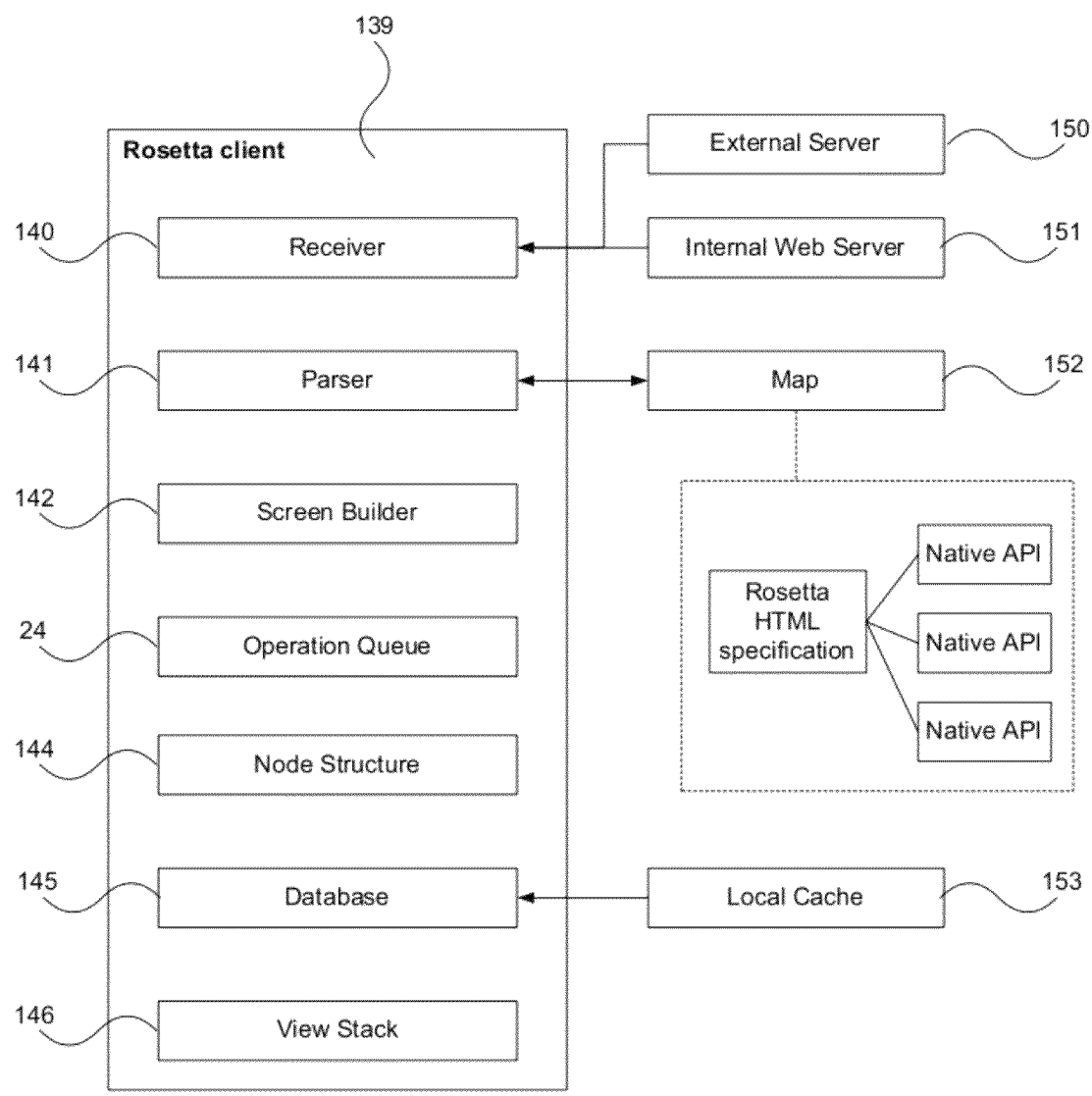
FIG. 14 is a software component diagram of a Rosetta client.

FIG. 13 is a screenshot of an application using a table together with it associated Rosetta HTML file.

A native User Interface widget is used for rendering HTML on the mobile communications device. The User Interface widget is a special graphical user interface element to present data and interact with users. Different platforms call it different names, for example, control and view.

Figure 9:
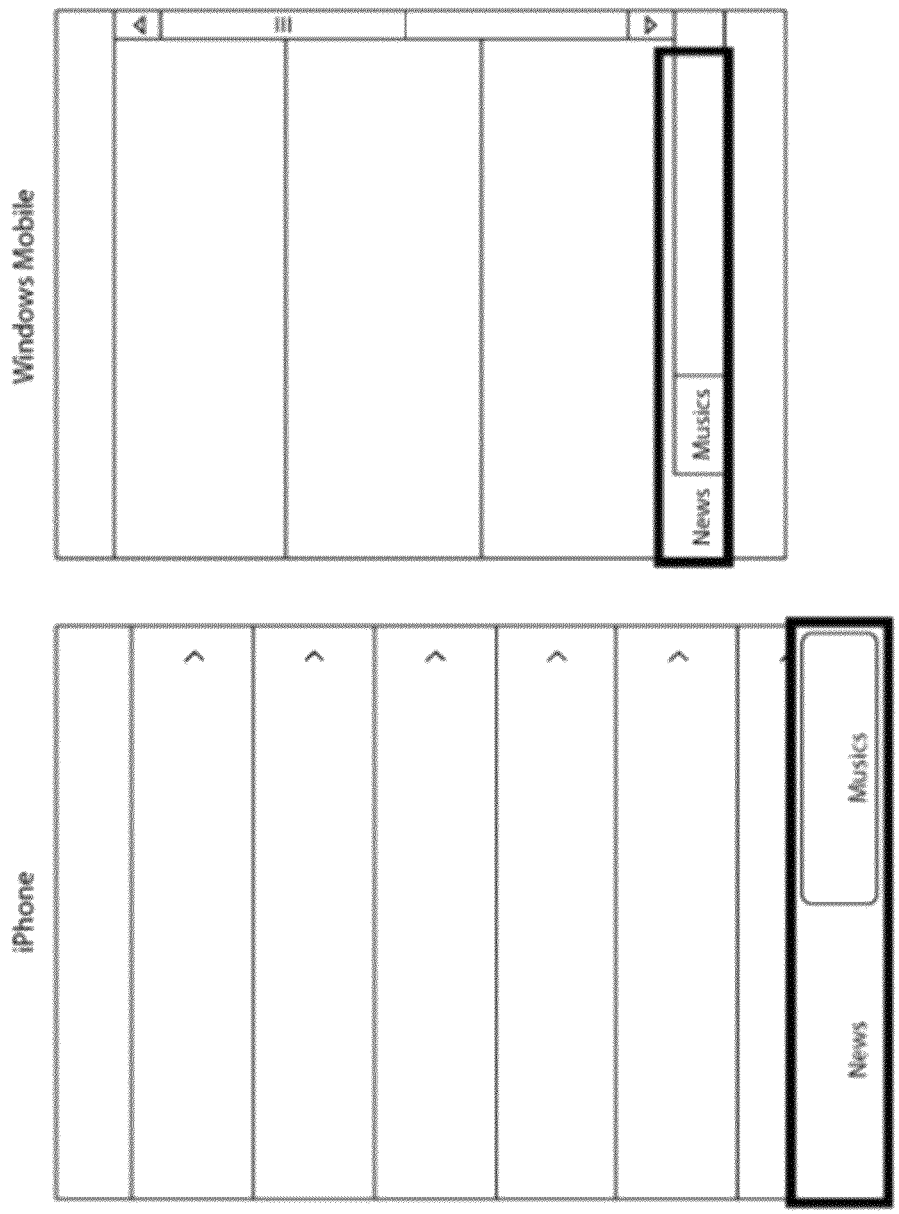
FIG. 9 is a screenshot of a tab displayed on two different mobile platforms.

Referring to FIG. 9, a first example is a tab. In HTML, the tab is defined as:

<div wf_type="tabbar"><a href="./link1.htm"
wf_tab_img="tab1.png">News</a><a href="./link2.htm"
wf_tab_img="tab2.png">Musics</a></div>

The tab will look different on different platforms because it depends on how a tab is typically constructed for a particular platform.

Figure 10:
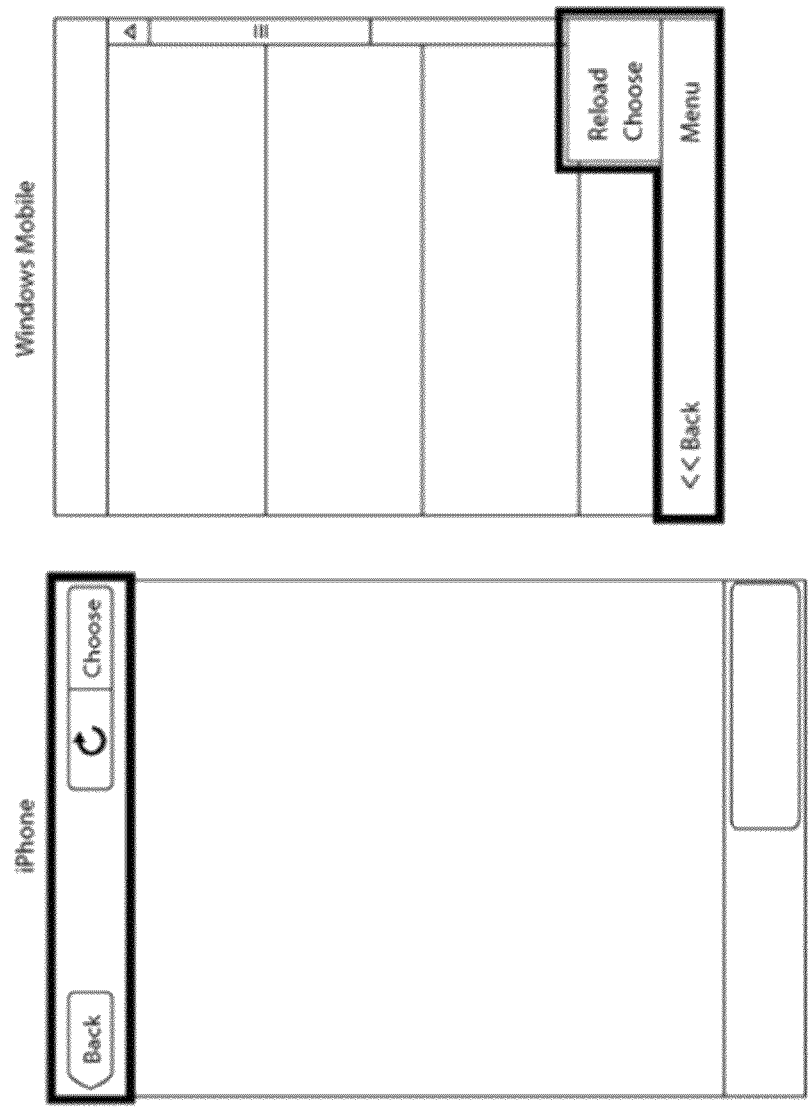
FIG. 10 is a screenshot of a toolbar displayed on two different mobile platforms.

Referring to FIG. 10, a second example is a toolbar. In HTML, the toolbar is defined as:

<a href="./link1.html" wf_style="toolbar"><img
src="reload.png" title="Reload"/></a>
<a href="./link2.html" wf_style="toolbar">Choose</a>

The toolbar will look different on different platforms because it depends on how a toolbar is typically constructed for a particular platform.

The native hardware/software functionality is exposed by using pre-defined phrase on hyperlink or HTML form input. The hyperlink and HTML form input are the methods to interact with servers in HTML.

A first example of native hardware/software functionality is GPS. GPS is defined as [wf:gps]. In this example, the GPS location is submitted to a server:

<a href="./link2.html?latlng=[wf:gps]">My Location</a>
<form action="./post.php">
<input type="hidden" name="latlng" value="[wf:gps]"/>
<input type="submit" value="My Location"/>
</form>

To use GPS, the author needs to define it by obtaining the GPS coordinate using the mobile communications device by writing [wf:gps] in the Rosetta HTML file. The Rosetta client replaces [wf:gps] with the GPS location, for example, 37.0625,−95.677068.

A second example of native hardware/software functionality is map parameters. Map parameters are defined as [wf: map_center], [wf:map_zoom]. In this example, the map parameters are submitted to a server:

```
<a href="./map.html?center=[wf:map_center]&zoom=
[wf:map_zoom]">Refresh</a>
<form action="./map.php">
<input type="hidden" name="center" value="[wf:map_center]"/>
<input type="hidden" name="zoom" value="[wf:map_zoom]"/>
<input type="submit" value="Search within current map"/>
</form>
```

Figure 12:
FIG. 12 is a screenshot of a map application together with it associated Rosetta HTML file.

The Rosetta client replaces [wf:map_center] and [wf:map_zoom] with the center location and the zoom of the showing map respectively, for example, 37.0625,−95.677068 FIG. 12 is a screenshot of a map application together with it associated Rosetta HTML file.

Figure 11:
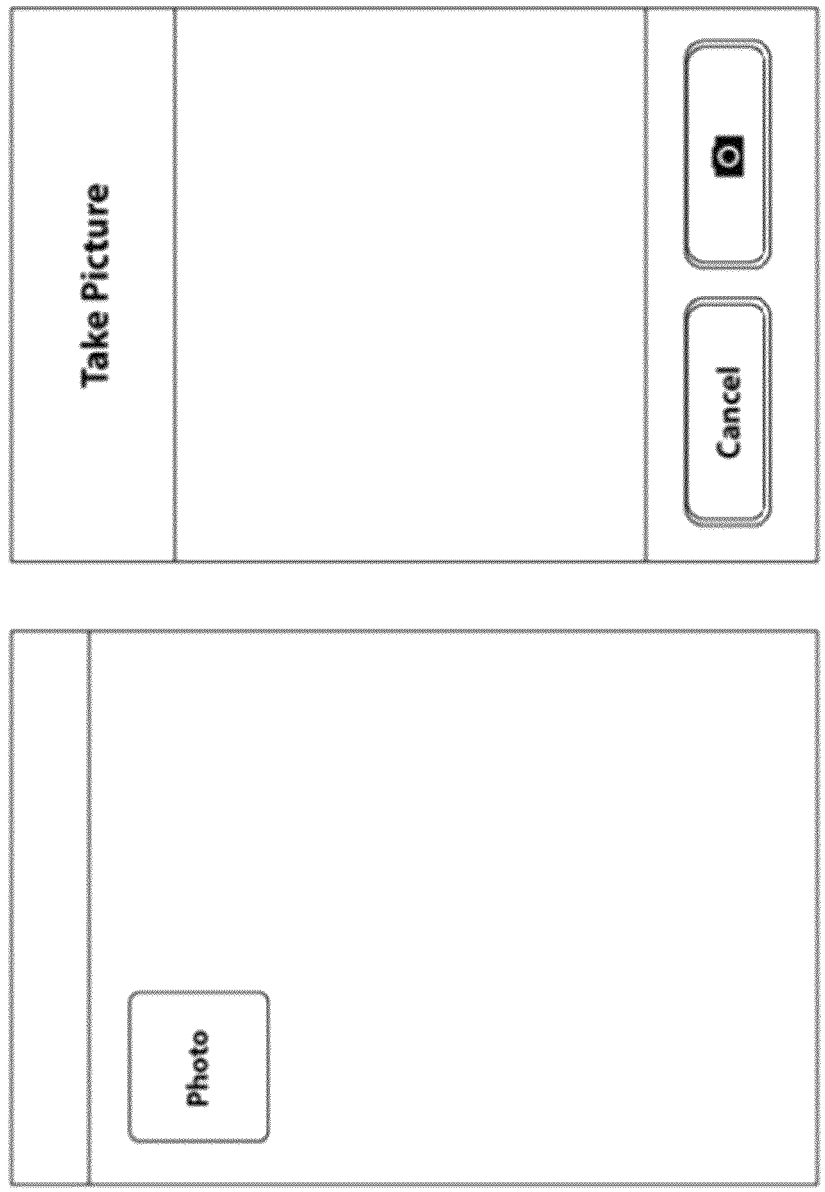
FIG. 11 is a screenshot of a camera input displayed on the mobile communications device.

Referring to FIG. 11, the native hardware/software functionality is exposed by using a special widget definition. A first example of native hardware/software functionality is camera input. In HTML, camera input is defined as:
<input type="file" wf_type="camera"/>

To use the camera input, the photo button is clicked. The camera screen is displayed. A photo is taken from the UI. The HTML form is submitted as a normal file input.

EXAMPLE APPLICATIONS

User may build their own online store and sell digital items such as ringtones and wallpapers. Combining with the native client, it gives a seamless shopping experience. Another example is a contact application. Application may be created by integrating existing applications together. New applications can be created by customizing existing ones. For example, another user can just download a contact application created earlier, enrich it with a "Date of birth" and "Address" field, and publish it as a new application. This may further speed up development time and reduce programming costs.

Visual GUI Authoring Tool

To help people without any programming knowledge create their own applications, a visual graphical user interface (GUI) may be provided. Internet users can create applications that run on the web and natively on mobile communications devices. The user can create a model and view visually in one unified step. A What You See Is What You Get (WYSIWYG) interface creates the view, and the model is generated automatically. Common operations as are generalized as templates. Common operations are generalized and presented as templates. When users choose different templates using the WYSIWYG interface, they are actually choosing different controllers for their applications. All the views/screens of an application are laid out on one consistent 2D grid. Typically, it is difficult for a user to conceptualize an application in pure source code. All the views or screens of the application including the search screen and the form screens are placed on a 2D grid. The grid provides a single place to hold all the screens and it is also a map to allow the user to navigate through different screens when using the application.

To create an application using the visual authoring tool involves three main steps: creating a form, specifying the layout of the form(s) and specify the index of the application for searching purposes. The user creates the form to store his data. In database terminology, a form corresponds to a record. The user specifies the layout of the forms which determines how should people browse through them. The user can pick different templates for the layout by answering how they will group the forms into columns and how the forms in a column should be sorted. The grouping and sorting are based on picking the fields created earlier. The last step in creating the application is to specify the index of the application that allows people to search the forms.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for executing an application on a mobile communications device, the method comprising:
    parsing a file containing mark up language to define the application, wherein the file is parsed by a client software;
    generating the application during run time to create a native application for the mobile communications device, wherein the application is generated by the client software, and wherein the client software maintains an operation queue, node structure, database and view stack;
    generating user interface (UI) components for the native application by mapping procedures defined by the markup language to native application programming interface (API) calls of an operating platform of the mobile communications device;
    loading a start page by inserting a root universal resource locator (URL) Link into the operation queue;
    storing a subset of elements in the node structure; and
    traversing the elements in the node structure, building a UI screen from the node structure using native UI components.

2. The method according to claim 1, wherein the mark up language is hypertext markup language (HTML) with extensions to a <a> tag, <div> tag, <input> tag, <select> tag, <table> tag and <td> tag.

3. The method according to claim 1, wherein data transfer between the client software and an external server is mediated by an internal web server.

4. The method according to claim 3, wherein the internal web server transfers the data communication between the client software and the external server without making any changes.

5. The method according to claim 3, wherein the internal server is a fully functional backend that handles all the client requests such that the client software is able to function without being connected to the external server by allowing the internal web server to return cached files instead of fetching them from the external server.

6. The method according to claim 1, wherein an image node element inserts a load image operation into the operation queue such that the image is post-loaded as the image is loaded only after other UIs have been constructed.

7. The method according to claim 1, wherein an outward link node element inserts a load page operation into the operation queue such that the page is pre-loaded as the page is loaded before the user sees it.

8. The method according to claim 1, further comprising: handling navigation from a current screen to a next screen by inserting the link of the next screen into the operation queue and assigning it with the highest priority; handling map and GPS interaction by inserting native controls above a map web view; handling camera and file dialog by triggering a local camera and file dialog; where if a user clicks on a link that leads away from the current page, the operation queue is emptied and the current screen is loaded to the view stack.

9. A system for executing an application on a mobile communications device, the system comprising:
    a data source to supply a file containing mark up language to define the application; and
    a client software provided on a mobile communications device to:
        receive and parse the file in order to generate the application during run time to create a native application for the mobile communications device,
        generate user interface (UI) components for the native application by mapping procedures defined by the mark-up language to native application programming interface (API) calls of an operating platform of the mobile communications device,
        maintain an operation queue, node structure, database and view stack;
        load a start page by inserting a root universal resource locator (URL) Link into the operation queue,
        store a subset of elements in the node structure, and
        traverse the elements in the node structure, building a UI screen from the node structure using the native UI components.

10. The system according to claim 9, further comprising a map to define relationships between the procedures and native API calls for a plurality of operating platforms for mobile communications devices, the map being read by the client software when generating the application.

11. The system according to claim 9, further comprising a visual graphical user interface authoring tool to generate the file by visual manipulation of graphical components on a grid, and to provide templates for common operations.

12. The system according to claim 9, wherein the mark up Language is hypertext markup language (HTML) with extensions to the <a> tag, <div> tag, <input> tag, <select> tag, <table> tag and <td> tag.

13. The system according to claim 9, wherein the data source is an external server accessible via the Internet or an internal web server.

14. A mobile communications device, comprising:
    memory containing a client software for executing an application on the mobile communications device; and
    a processor;
    wherein the processor is configured by the client software to:
        receive a file containing mark up language to define the application on the mobile communications device, using a receiver module that is provided on the mobile communications device;
        parse the file to generate the application during run time to create a native application on the mobile communications device, using a parser that is provided on the mobile communications device;
        maintain a node structure to store a subset of elements, wherein the node structure is provided on the mobile communications device;
        define a screen builder that is provided to generate UI components for the native application by mapping procedures defined by the mark-up language to native application programming interface (API) calls of an operating platform on the mobile communications device, traversing the elements in the node structure, and thereby building a UI screen from the node structure using the native UI components, wherein the screen builder is provided on the mobile communications device;
        maintain an operation queue provided as a location to insert a root universal resource locator (URL) Link into thereby loading a start page, wherein the operation queue is provided on the mobile communications device;
        maintain a database, wherein the database is provided on the mobile communications device; and
        maintain a view stack, wherein the view stack is provided on the mobile communications device.

15. The software client according to claim 14, wherein the mark up language is hypertext markup language (HTML) with extensions to the <a> tag, <div> tag, <input> tag <select> tag, <table> tag and <td> tag.

* * * * *